Figure 17:
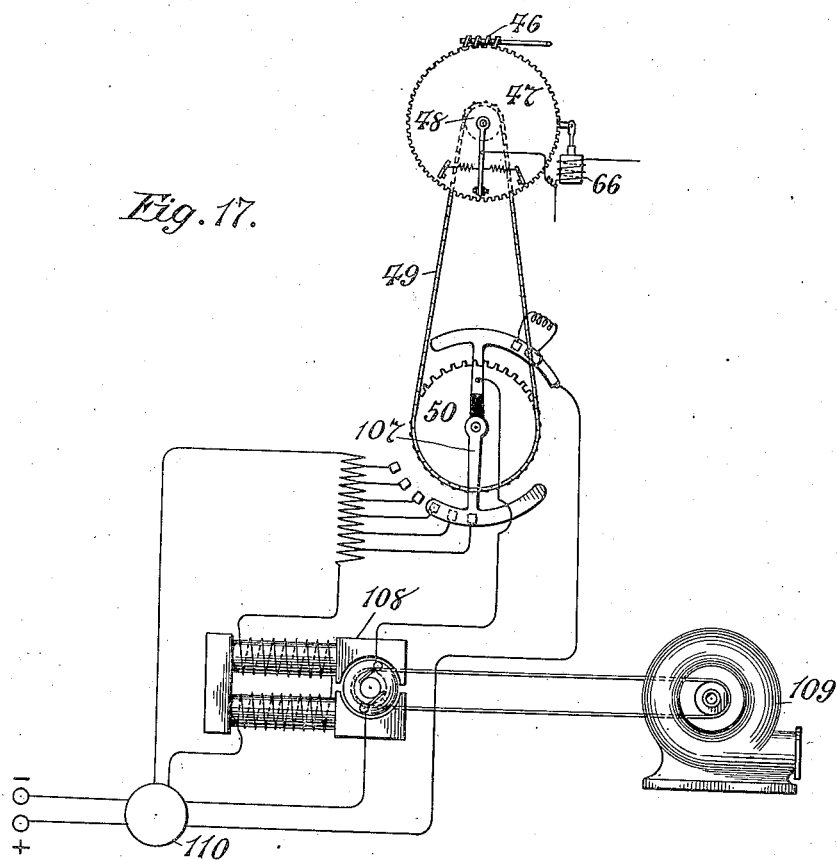

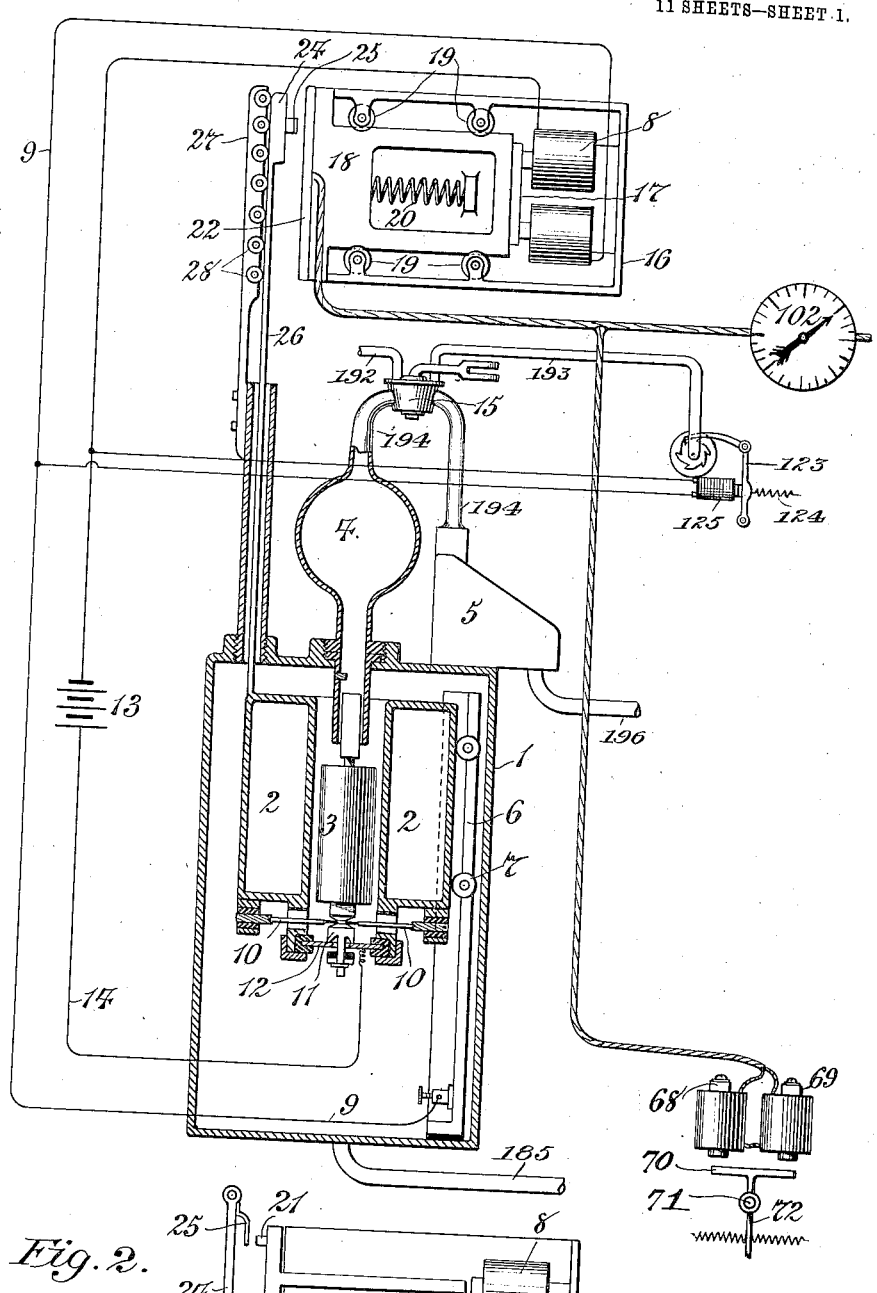
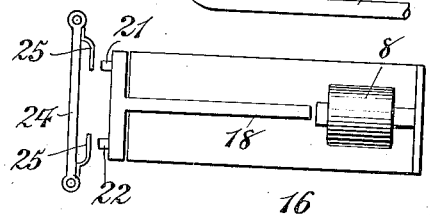

C. O. MAILLOUX & H. J. WESTOVER.
DRAFT REGULATING APPARATUS.
APPLICATION FILED FEB. 7, 1907.
935,763.
Patented Oct. 5, 1909.
11 SHEETS—SHEET 2.
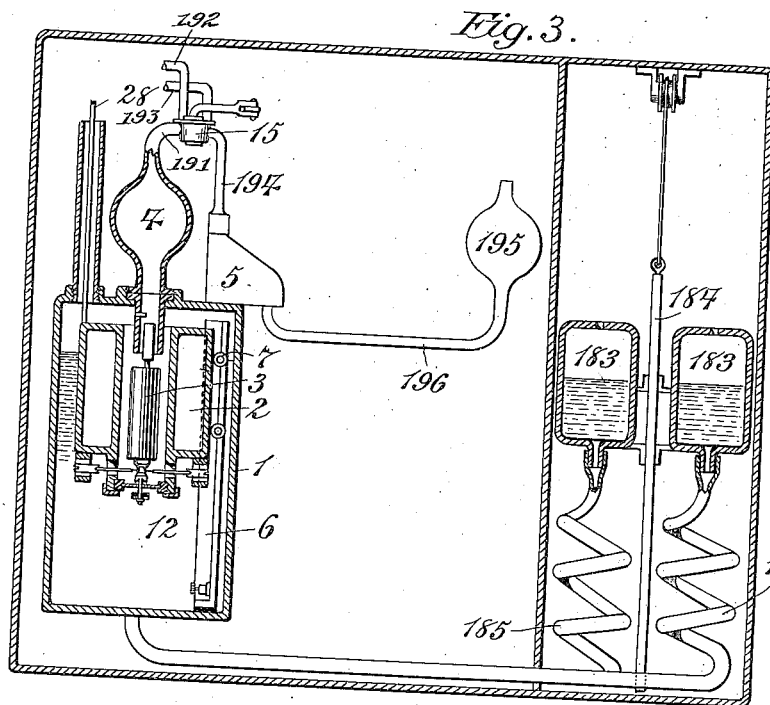
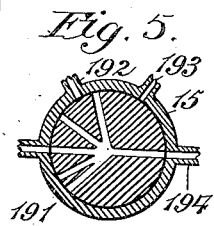
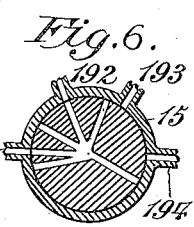
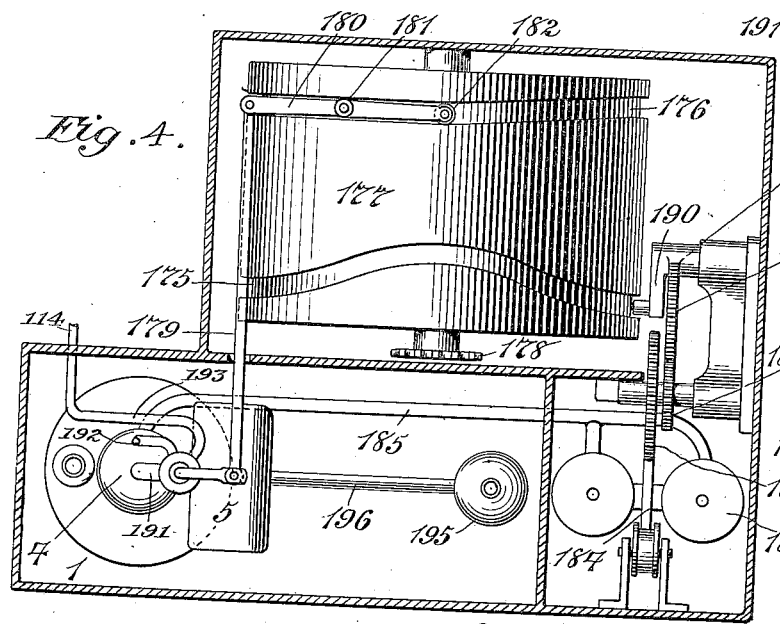
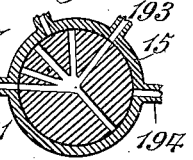

C. O. MAILLOUX & H. J. WESTOVER.
DRAFT REGULATING APPARATUS.
APPLICATION FILED FEB. 7, 1907.
935,763.
Patented Oct. 5, 1909.
11 SHEETS—SHEET 3.
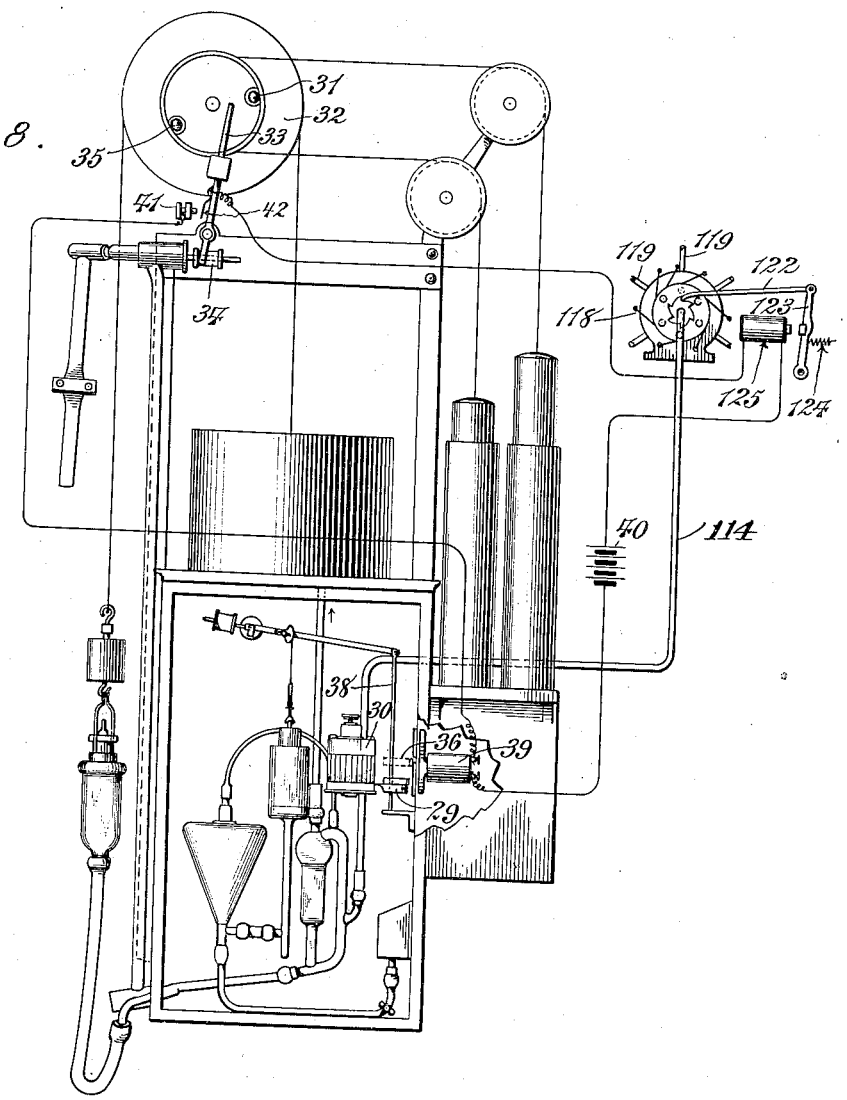
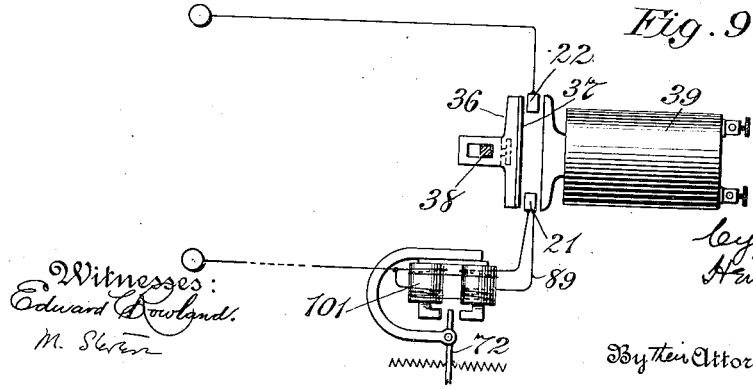

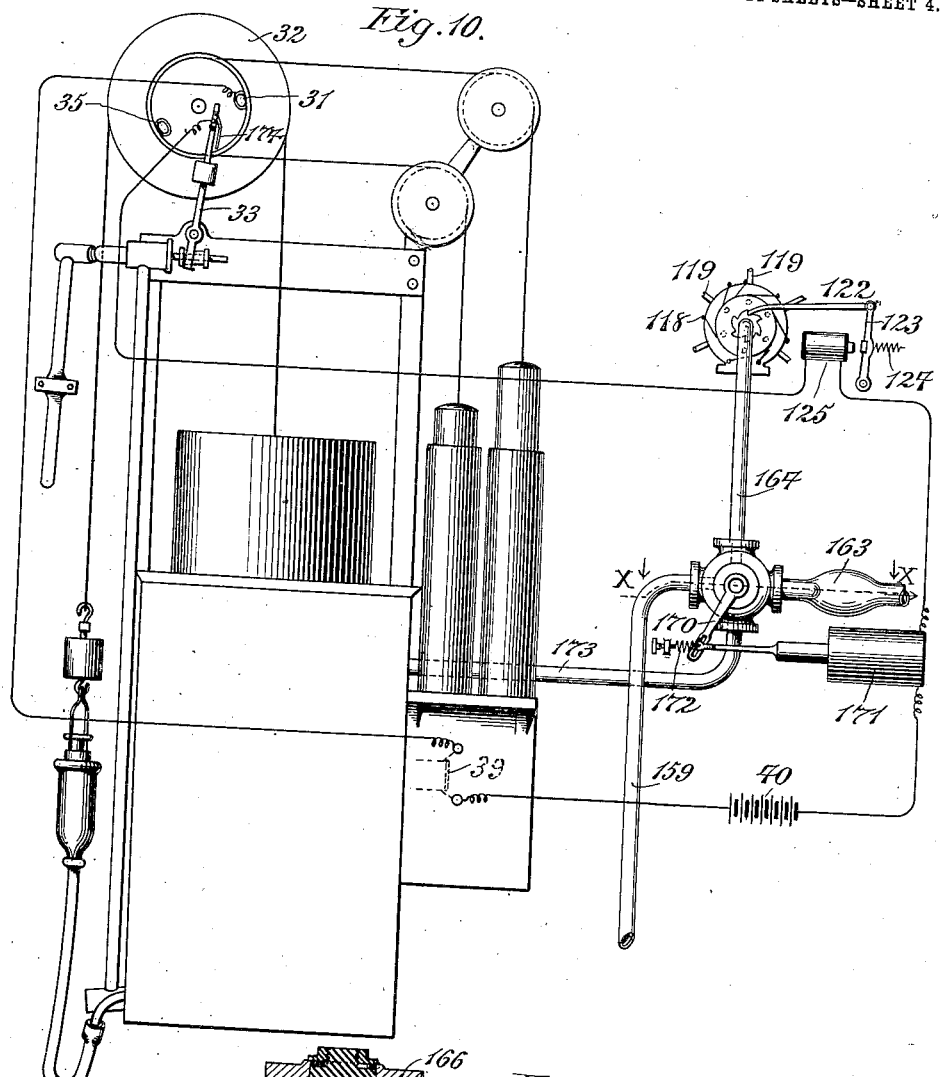
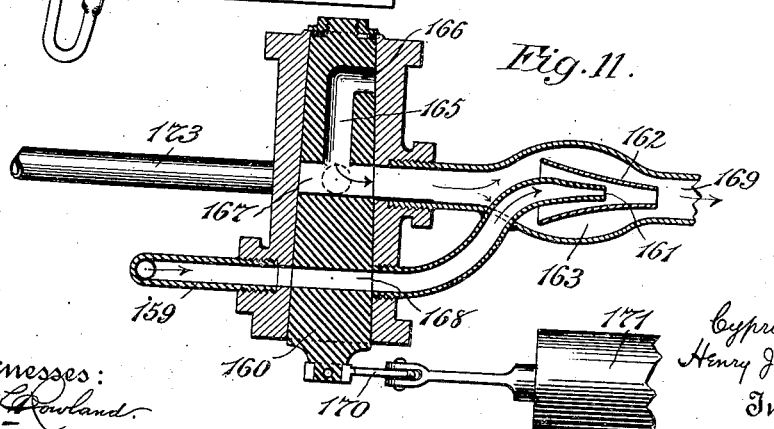

C. O. MAILLOUX & H. J. WESTOVER.
DRAFT REGULATING APPARATUS.
APPLICATION FILED FEB. 7, 1907.
935,763.
Patented Oct. 5, 1909.
11 SHEETS—SHEET 5.
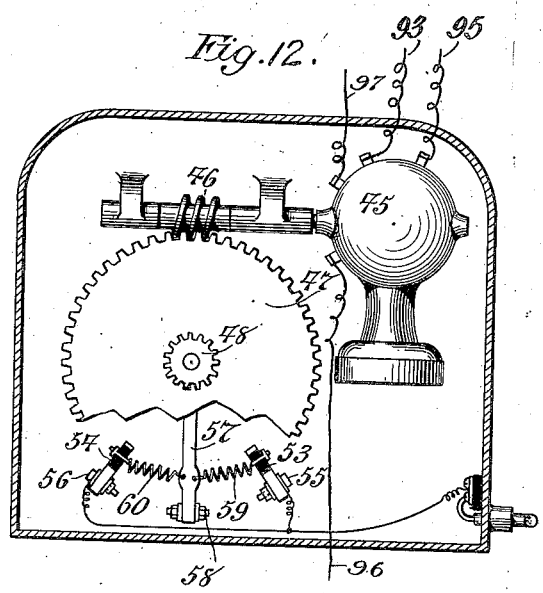
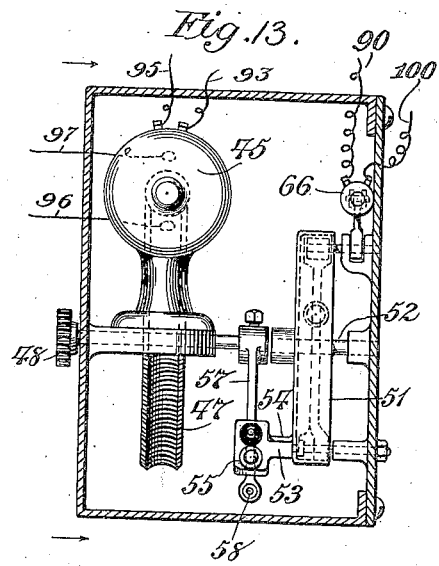
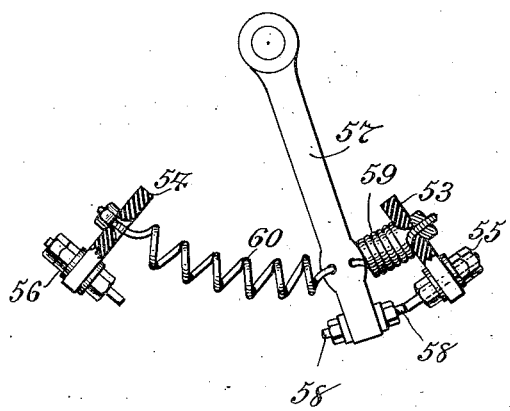
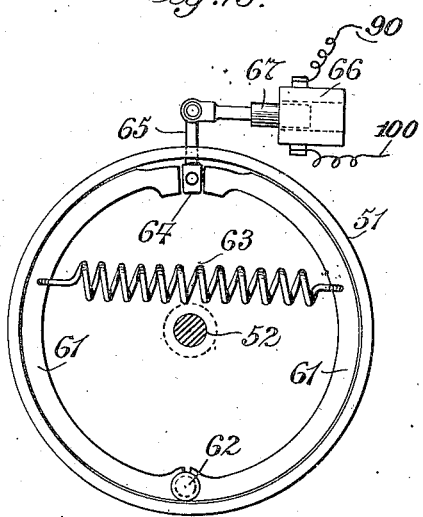
Witnesses:
Edward Rowland
M. Stern
Cyprien O. Mailloux
Henry J. Westover
Inventor
By their Attorney H. S. MacKaye

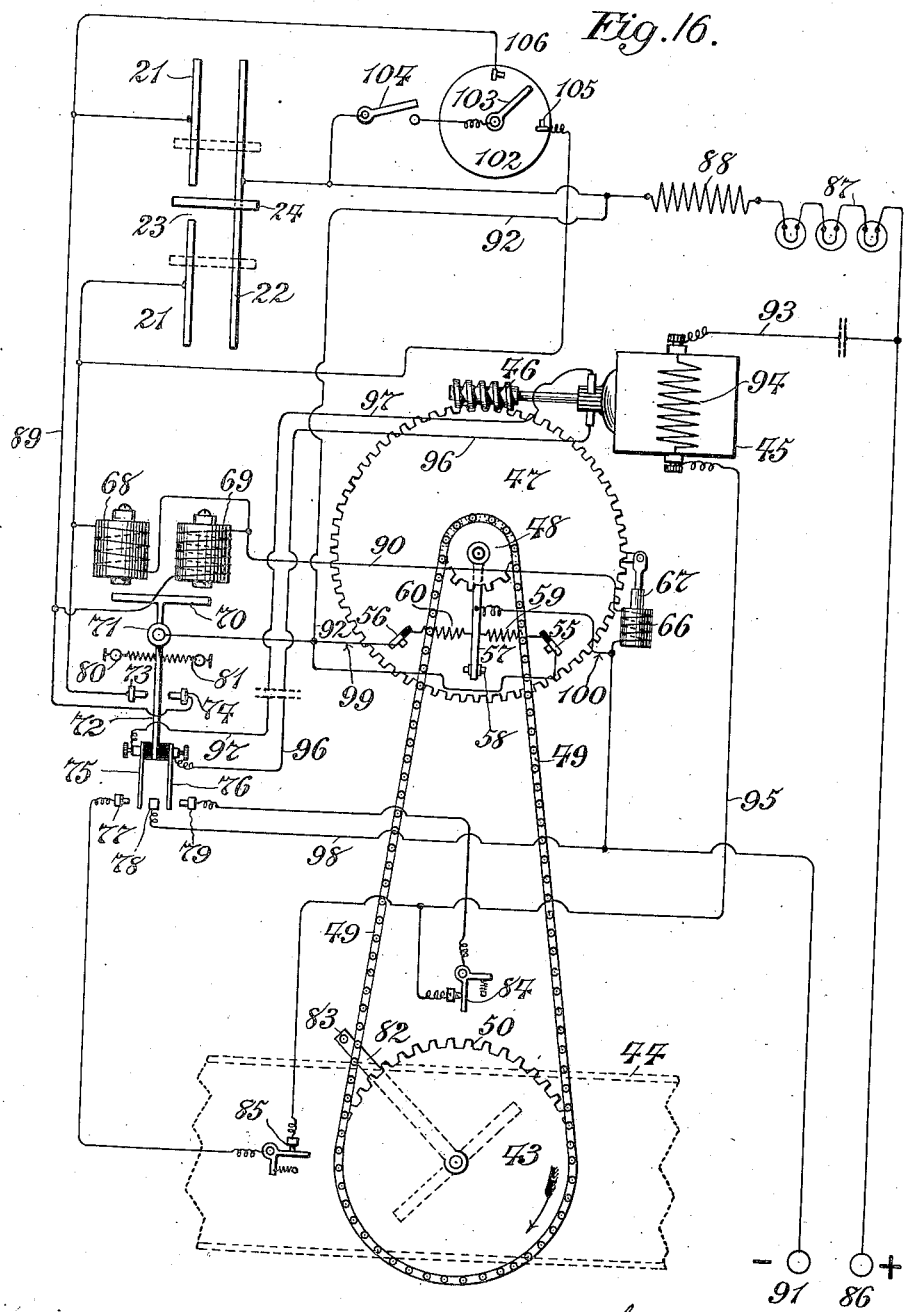

C. O. MAILLOUX & H. J. WESTOVER.
DRAFT REGULATING APPARATUS.
APPLICATION FILED FEB. 7, 1907.

935,763.

Patented Oct. 5, 1909.
11 SHEETS—SHEET 7.

Witnesses:
Edward Dowland
M. Stern

Cyprien O. Mailloux
Henry J. Westover
Inventor
By their Attorney H. S. MacKay

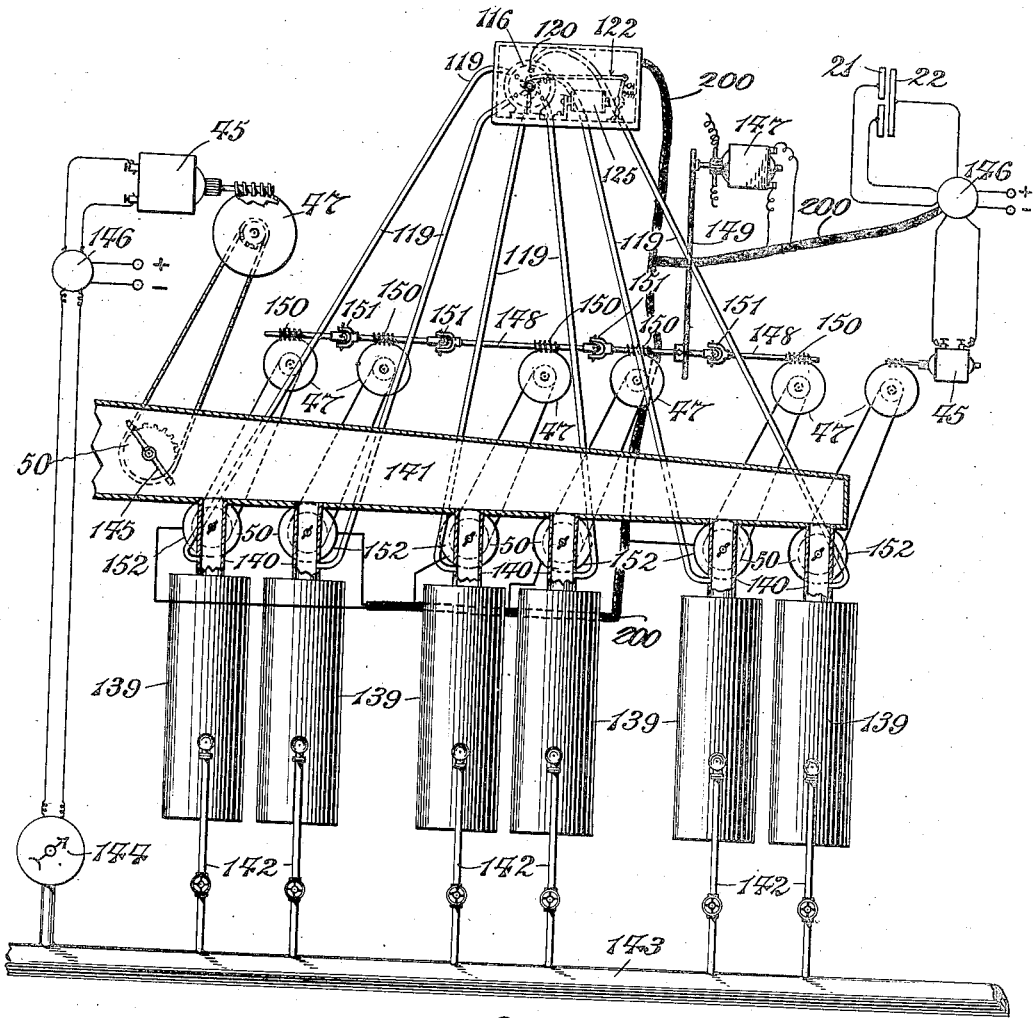
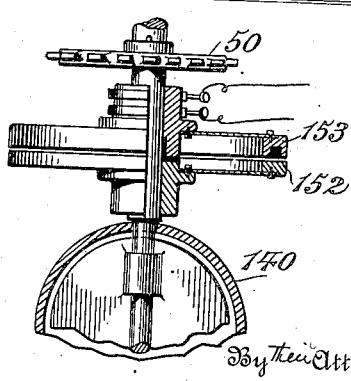

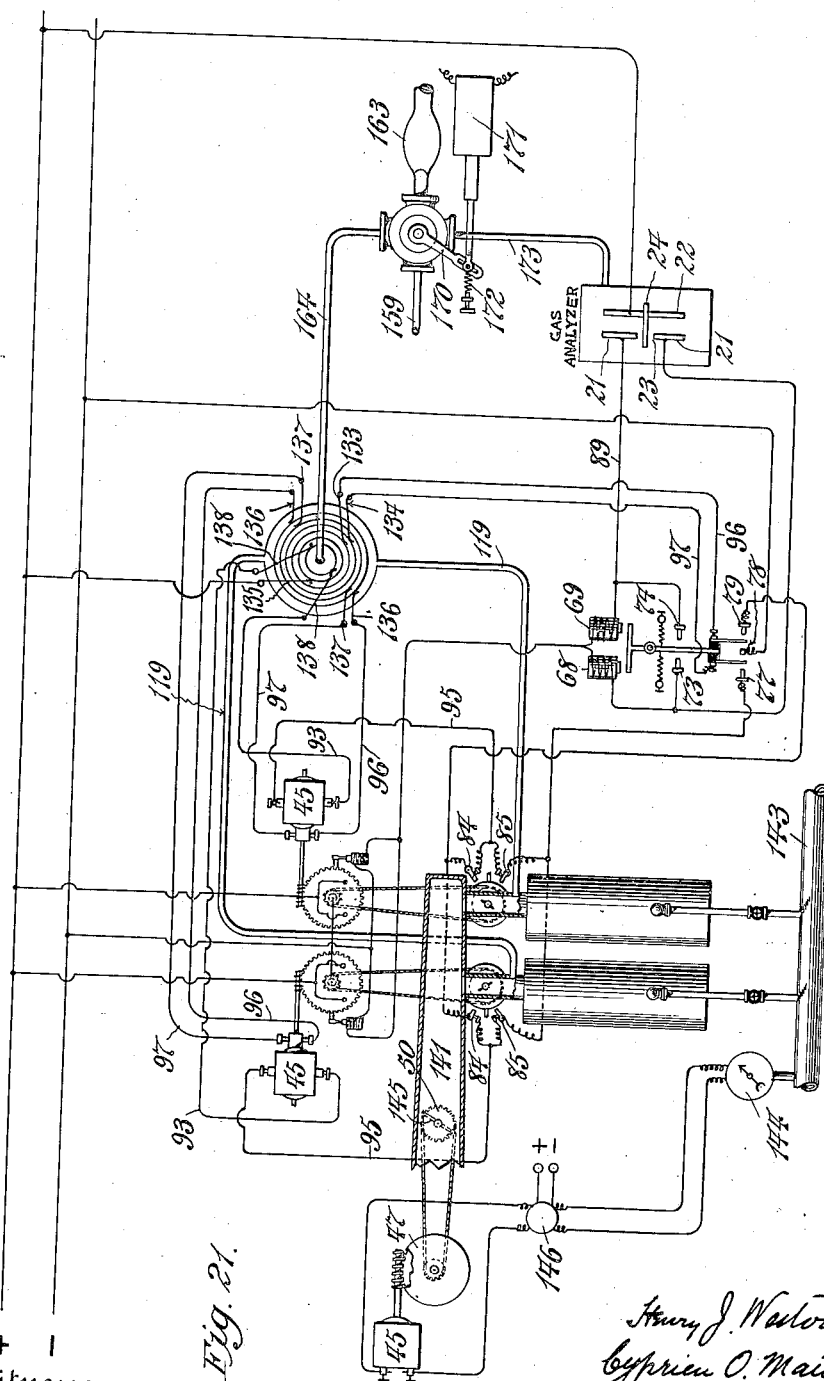

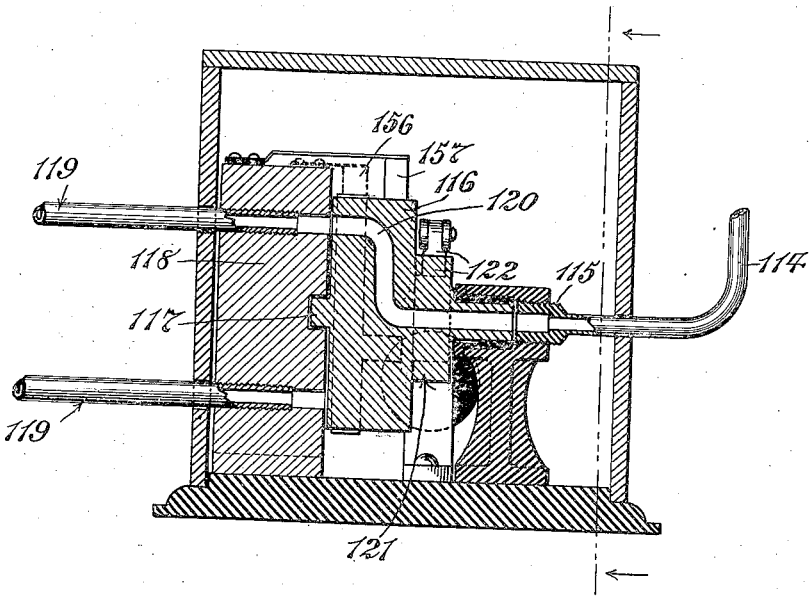
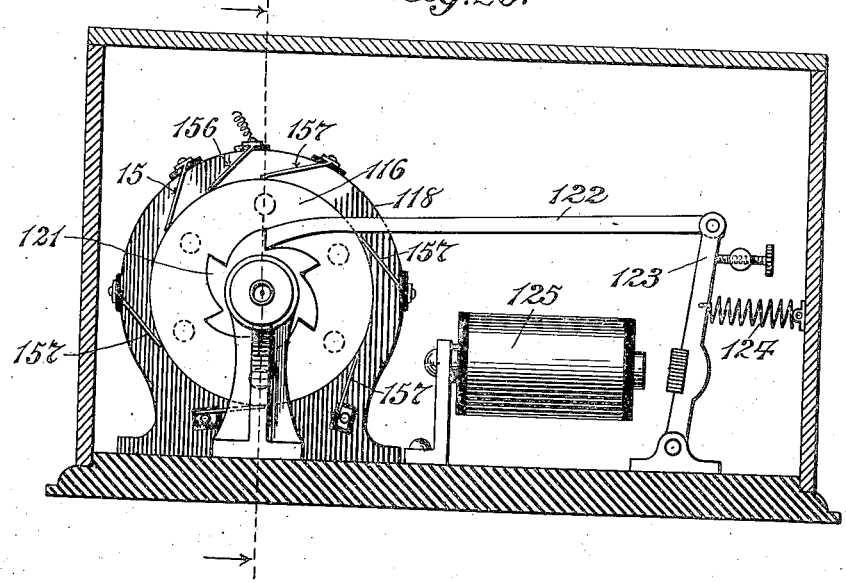

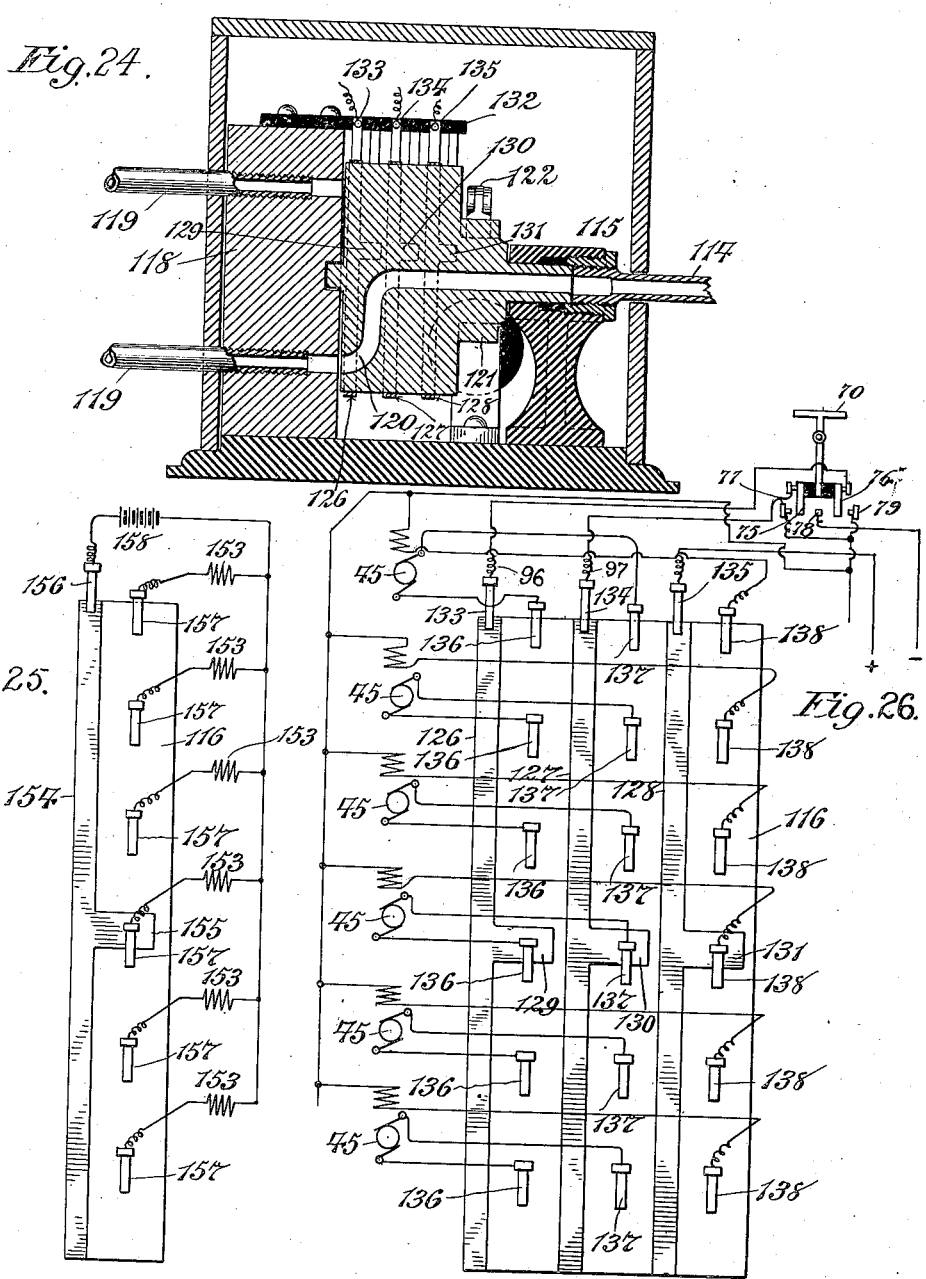

UNITED STATES PATENT OFFICE.

CYPRIEN O. MAILLOUX AND HENRY J. WESTOVER, OF NEW YORK, N. Y.

DRAFT-REGULATING APPARATUS.

935,763.  Specification of Letters Patent.  Patented Oct. 5, 1909.

Application filed February 7, 1907. Serial No. 356,188.

*To all whom it may concern:*

Be it known that we, CYPRIEN O. MAILLOUX and HENRY J. WESTOVER, citizens of the United States, and residents of the city, county, and State of New York, have invented a new and useful Improvement in Draft-Regulating Apparatus, of which the following is a specification.

Our present invention relates to automatic means for the regulation of oxygen supply to furnaces in general, and particularly to steam boiler furnaces for all purposes, and the principal object of this invention is the provision of means whereby better economy in fuel consumed is obtained and whereby this end is automatically reached without the necessity of constant skilled engineering supervision.

Our invention is applicable in connection with any kind of draft controlling device, whether with a damper or air valve in the air pipes leading into the furnace or in the flues leading products of combustion out of the furnaces or with a mechanical blower or a steam and air blast. We have accordingly shown and described our invention as used in connection with all of these forms of draft controlling device.

The amount of oxygen which is supplied for combustion of fuel in the furnaces of steam boilers should be varied and regulated with relation to two principal considerations. First, with respect to the steam generating capacity or output of the boiler; and second, with respect to the efficiency of the boiler viewed as an apparatus for the conversion of the energy latent in the fuel into useful energy. Since the conditions vary greatly in different boiler plants, it will be found that in some cases the first of these requirements is of paramount importance while in other cases it is the maintenance of a high conversion efficiency or the attainment of great economy in combustion which is of principal importance. In most instances both considerations require attention.

In the U. S. Patent to one of us (Henry J. Westover) No. 881272, dated March 10th 1908, there is described and claimed broadly certain general apparatus for carrying out some of the ends aimed at by our present invention, but the present invention involves certain advances and improvements over said earlier invention, in details of construction, arrangement and operation, besides increasing the scope and utility of the whole system.

One object of our present invention is to provide automatic means for draft regulation depending upon variations in the amount or intensity of heat developed in a given furnace or series of furnaces, and, where these are used for heating boilers, this branch of our invention aims to regulate with a view to maintaining a predetermined steam output.

Another object of this invention is to provide automatic means for draft regulation depending upon variations in the products of combustion, and this branch of our invention aims to regulate with a view to attaining a maximum economy in combustion.

In its completest form, our invention is adapted for use in connection with plants where both maintenance of a predetermined output and attainment of a maximum economy consistent with this condition are desirable.

Another object of this invention is to provide automatic means for either or both classes of regulation above specified to be used in various arrangements with a battery of boilers; and, in the preferred form more specifically claimed herein, this is accomplished by governing each single boiler furnace separately for economy in combustion and governing all together at the same time for maintenance of steam pressure or output.

Another object of this invention is to provide means whereby a single gas analyzing device may be brought into operative relation with a number of draft controlling devices successively while, at the same time, gases from the appropriate furnaces are received for analysis in the proper sequence for attaining the correct result in each case. Another object of our invention is the provision of means whereby the samples of gas conveyed to the analyzer in each instance are made representative of the particular condition of the furnace to be controlled existing at the time the analysis is made. This branch of our invention aims to counteract the disturbing effect of using long conveying pipes between the furnace or furnaces and the analyzer.

Another object of our invention is the provision of improved apparatus for some or all of the ends above named which may be commercially and successfully used with various forms and systems of gas analyzing apparatus, and we have shown and described specific adaptations of our broad invention to two such systems in illustration merely of the flexibility of our system.

We have illustrated in the accompanying drawings certain illustrative embodiments of our invention as a whole and of some of the forms which its various parts may take. It is to be understood that these specific arrangements are merely examples of the indefinite number of constructions which are within the scope of our invention in its various parts and aspects.

Figure 18:
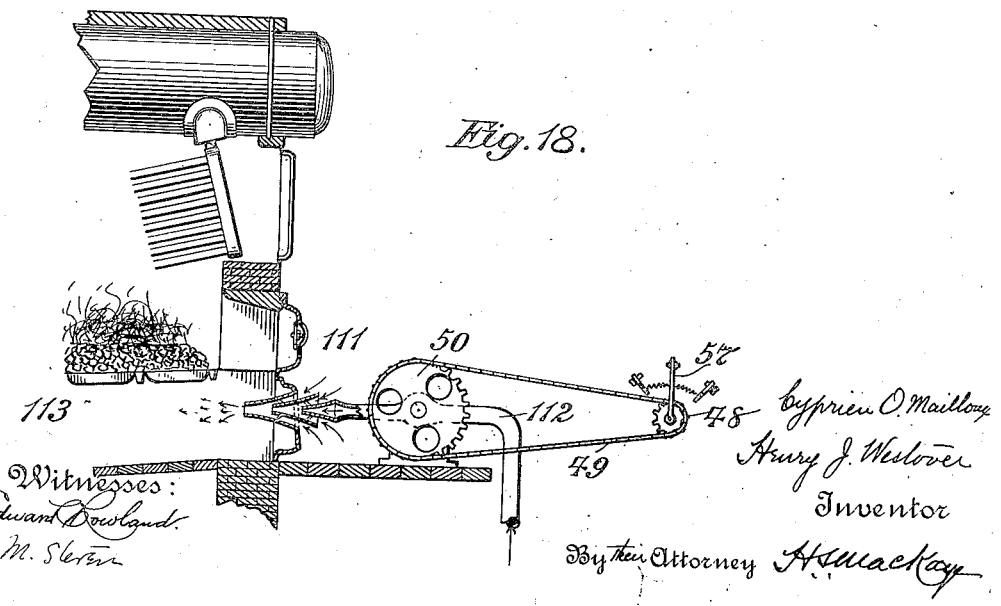

In the accompanying drawings Figure 1 is a sectional view of a part of one form of $CO_2$ analyzer in connection with one form of circuit controller adapted thereto showing in diagram the preferred relation thereof to certain other parts of our apparatus; Fig. 2 is a partial plan view of the circuit controller of Fig. 1; Fig. 3 is a side view of one form of complete automatic analyzer; Fig. 4 is a top view of the same; Figs. 5 to 7 are sectional views of the gas valve 15 in different positions; Fig. 8 is an elevation of a modified form of analyzer adapted to our invention; Fig. 9 is a plan view of the circuit controller shown in Fig. 8; Fig. 10 is a general view showing the relation of the pipe-clearing device to our apparatus; Fig. 11 is a sectional view of one form of pipe-clearing device as thus used; Fig. 12 is an elevation of one form of motive means for the draft controlling device; Fig. 13 is an end view of the same; Fig. 14 shows the short circuit lever in Figs. 12 and 13 on a larger scale; Fig. 15 is an elevation of the electromagnetic clutch and disk used in connection with said motive means; Fig. 16 shows the mechanical relation of the motive means to one form of draft controlling device and the electrical relations of both to the other elements in our apparatus; Fig. 17 shows a modification adapted to another form of draft controlling device; Fig. 18 shows still another adaptation of this kind; Fig. 19 shows in diagram one preferred adaptation of our entire system to a battery of six boilers each with its own furnace; Fig. 20 is a partly sectional view of a form of electro magnetic clutch suitable for use with the system shown in Fig. 19; Fig. 21 is a diagrammatic view similar to Fig. 19 but showing the connections for one specific form more in detail and in connection with two boilers instead of with six; Fig. 22 is a sectional view of one form of gas directing devices and commutator; Fig. 23 is an end view thereof; Fig. 24 is a side view of the same as constructed with the three ring commutator; Fig. 25 shows a development of the one-ring commutator and Fig. 26 is a similar view of the three-ring commutator.

In order to avoid all misunderstanding, the relation of the devices shown in the various figures to our unitary invention may be stated as follows—

Figs. 1 and 2 on the one hand and Figs. 8 and 9 on the other hand show alternative specific forms of analyzer as examples of various modifications which may be used in a system including our invention.

Figs. 12 to 15 inclusive show preferred details which may be used, as hereinafter described, with any modification of the invention and in connection with the circuits shown in Fig. 16. Fig. 16 shows in diagram one illustrative form of our entire system, the analyzer (of whatever construction) being represented by the rails 21, 22. The devices shown in Figs. 17 and 18 are alternative specific forms of the mechanical portions of what is shown in Fig. 16 and are illustrative of the variety of forms which this portion of the invention may take.

In Figs. 19 and 21 are shown in a condensed form views of the entire system constructed according to this invention, and a number of modifications are indicated in Fig. 19 working harmoniously together for successive control of the individual members of a group of boilers and flues. Figs. 20 and 22 to 26, inclusive, show preferred details of parts illustrated less fully in other figures. Figs. 10 and 11 show a preferred application of automatically operated pipe clearing means, useful in connection with any suitable form of the other parts of our system. Figs. 3 to 7 inclusive show preferred details of means for automatic operation of the analyzer shown in Fig. 1, for instance.

In the patent to Henry J. Westover, above referred to, there is described an apparatus wherein a simple operation of a $CO_2$ analyzer (or steam gage) closes one or another of a number of circuits, each of which energizes a separate solenoid coil. All of the solenoid coils act upon a common core by the position of which a damper is regulated to vary the draft in the manner shown to be desirable by the $CO_2$ analysis (or by steam pressure) which governs the circuit controller. The present apparatus differs from said former device in that a single reversible rotary motive means is governed by the analyzer (or steam gage) according as the conditions of $CO_2$ or of steam pressure are above or below an ideal mean. The motive means moves in one direction and produces diminution of draft (for instance) when too little $CO_2$ is indicated or when steam pressure is excessive, and the opposite indications produce reverse movement of the motive means and the opposite effect on the draft controlling device.

Our present invention covers any mode of transmission whereby the analyzer is made to determine the action of the motive means upon the draft controlling device, but we prefer to employ electricity for this purpose and, while various means may be employed to this end, we prefer in general those herein shown and described. In describing our preferred apparatus we shall first explain the means employed in connection with the analyzer and then the mode of use of the pressure gage in connection with our invention.

An initial circuit controller, preferably governed in its operation by an electromagnet is operated by the analyzer in such a manner that its operation takes place at the moment that each analysis is completed or, in other words, at the moment when a recording analyzer makes its record. The particular circuit modified by this operation (whether by opening or closing the same) is determined by the position of the moving part of the analyzer at the moment in question, and a corresponding operation of the motive means is thereby produced. The particular construction employed for thus controlling the initial circuit depends upon the type of analyzer which is used, and we have shown two types of analyzer in this connection.

It is an important feature of the preferred form of this invention that the draft-controlling means are actuated by a "self-limiting" mechanism. That is to say, the mechanism which causes movement of the damper or its equivalent receives periodical initiatory impulses and then proceeds to complete a certain pre-determined and adjustable duty, independently of the $CO_2$ analyzer and its adjuncts. This duty is limited by conditions inherent in the actuating mechanism itself, and therefore we have termed our actuating mechanism "self-limiting" in our claims. One advantage in this feature of our invention lies in the fact that it may be employed with initial circuit closers acting either periodically (as shown herein) or continuously.

In Fig. 1 there is shown a modified form of the analyzer shown in the patent to Henry J. Westover, No. 833274, for improvement in machine for analysis of gas, dated October 16th 1906. Here a proper displacing liquid enters a vessel 1, and lifts two floats, 2 and 3, the latter of which enters the supplemental chamber 4 communicating with the absorption chamber 5, in the manner explained in said patent. The floats are guided by uprights, one of which is shown at 6, and by rollers 7 on said uprights.

Figs. 3 to 7 inclusive show enough of the entire instrument in question to illustrate the automatic operation thereof. The moving parts are preferably actuated by cams and, in the form shown, these take the form of suitably shaped grooves 175, 176, in a drum 177, which is constantly rotated through the sprocket 178 or otherwise. The lever of the valve 15 is governed by a rod 179 connected to a lever 180 pivoted at 181 and carrying a roller 182 which engages with the cam grooves 176. The reservoir 183 for the displacing liquid is carried by a vertical rack 184, and is connected by a flexible tube 185 to the bottom of the displacing chamber 1. The reservoir is moved up and down by a pinion 186 engaging the rack 184 and impelled by a pinion 187 and toothed sector 188 pivoted at 189 and carrying an arm 190 which is swung back and forth by engagement as shown with the cam groove 175.

Figs. 5, 6 and 7 show one form of valve suitable to be used at 15. The pipe 191 connects with the chamber 4, and the pipe 194 with the absorbing.

The position shown in Figs. 3 and 4 is that assumed by the apparatus when the reservoirs are descending and the level of the liquid in chamber 1 is falling, carrying the floats down. The valve is as shown in Fig. 5, and the residual gas in 5 passes from 194 to 191, being followed by the absorbing liquid in the fixed reservoir 195, connected to the chamber 5 by the pipe 196.

The action of the groove 175 and sector 188 continues to further depress the reservoir 183 and lower the level of the liquid in chamber 1, and then the groove 176 acts to place the valve 15 as in Fig. 6. The groove 175 at the same time reverses the sector 188 and raises the reservoir 183 so that the liquid rising in chamber 1 expels the gas through chamber 4, tube 191, and tube 192 to atmosphere. This continues until all the gas is expelled through the valve 15. Thereupon the groove 175 again reverses the sector 188 and lowers the reservoir 183, while the groove 176 places the valve 15 as in Fig. 7. The falling liquid then forms a vacuum which draws new furnace gas in from the tube 193 to the tube 191 and chamber 4. This continues until a predetermined volume of mixed furnace gases has filled the chamber 4, when the reservoir 183 is again raised by the sector 188, and the valve 15 resumes the position shown in Fig. 5. The furnace gases are thus driven by the rising liquid through the tube 191, valve 15, and tube 194 into the absorbing liquid ahead of it into the reservoir 195. This causes absorption of $CO_2$ and the cycle of operation above described begins again.

Where the device thus described is to be used with a plurality of furnaces the gas directing magnet 125 is connected as shown in Fig. 1, and is used as hereinafter described more fully.

One terminal of an electro magnet 8 is connected electrically by wire 9 and uprights 6 to the outer metal float 2 and, through the guiding wires 10, to the inner metal float. This latter carries contact points, as 11, which normally make contact with an insulated metal plate 12, carried by the float 2. The other terminal of said magnet is connected to one pole of a battery 13, the opposite pole of which is connected by the wire 14 to said insulated plate 12. When the liquid rising within the vessel 1 raises both floats, the balance is such that the points 11 remain in contact with the plate 12 and thus circuit through the coils of the magnet 8 is maintained. After absorption of the $CO_2$ from the furnace gases driven by the displacing liquid into the chamber 5, as described above, said liquid is caused to flow out of the vessels 1 and 4 and the floats 2 and 3 will move downward together until the difference in the pressures existing in the two chambers 1 and 4 is sufficient to balance the gravitative tendency of the float 3 tending to press the points 11 against the plate 12. When this balance is established, the circuit of the magnet 8 is broken, and the position occupied by the two floats when this action takes place will be determined by the extent to which the initial mass of furnace gases (originally admitted to the chambers 4 and 5 through the valve 15) has been diminished by absorption in said chamber 5. The position of the floats at the moment of separation is thus determined by the percentage of $CO_2$ in the fixed amount of furnace gas admitted at each operation of the analyzer, as set forth in the Letters Patent aforesaid. This position of the floats is made to govern in turn the mode of action of what may be called the "initial circuit controller" of our apparatus. This is preferably accomplished as follows.

The magnet 8, carried by the fixed frame 16, acts upon an armature 17 on a frame 18 adapted to move back and forth between rollers 19. The spring 20 tends constantly to push this frame 18 to the left in Fig. 1. The vertical flat face of the frame 18 carries two parallel vertical rails 21, 22, one of which is composed of two parts separated at the point 23 which may be called the neutral point and corresponds to the ideal proportion of $CO_2$ in the furnace (see Figs. 2 and 16). Circuit is closed across from one of these rails to the other by a bridging device 24 carrying contact springs 25, intended to bear upon the rails, 21, 22, when the frame 18 moves outward. This bridging device is carried by a rod or stem 26 projecting upward from the main float 2 in the vessel 1. We prefer to provide an abutment 27 which may be provided with rollers 28, and which is placed behind the bridging device to resist the thrust of the spring-pressed frame 18. By use of the apparatus so far described there is produced a continual succession of circuit breaks between the floats 2 and 3, the position of the floats at the time of each break being determined by the analysis of a sample of furnace gas introduced for the purpose. In this device each break of circuit at 11, 12, causes the magnet 8 to release the spring-pressed frame 18, which moves outward so that electric connection is set up by the bridging piece 24, 25, from one or the other section of the rail 21 to the opposite rail 22. The operations determined by this contact are described hereinafter. It will be seen that, where the gas directing magnet 125 is used, its action is controlled by the floats simultaneously with that of the magnet 8. The result of this will be made clear hereinafter.

In Fig. 8 is shown the mode of adapting our invention to another well known form of $CO_2$ analyzer and recorder. This device, which is known as the "Sarco" recorder is illustrated in Fig. 8 and, as it forms no part of our invention, needs no more description here than will suffice to make clear its connection with our apparatus. In this recorder the motive power is supplied by well known automatic pumps, shown just above the magnet 39; and the $CO_2$ percentage is indicated by a pen 29 which rises during each analysis and makes a mark upon the recording cylinder 30. As the pen reaches its highest position at the end of each analysis, the projection 31 on the wheel 32 automatically throws the upper end of the weighted lever 33 to the left and causes the slide valve 34 to open an exit for the residual gases. The pen 29 then returns to its lowermost position as shown and the wheel 32, being reversed, ultimately causes the projection 35 to throw the lever back to the position shown, when the slide valve admits a new sample of gas and a new analysis commences. We prefer to adapt our circuit closer to this device as follows:—A bridging piece 36, having a magnetic face 37 (see Fig. 9) is loosely supported upon the pen 29, being held in place by the stem 38 of said pen which passes through an elongated hole in said bridging piece. Opposite the path of vertical movement of the pen and bridging piece we place the conducting rails 21, 22, and behind these we place a magnet 39 in circuit with the battery 40 and a circuit closer composed of the fixed terminal 41 and the contact spring 42 on the lever 33. Each time the pen 29 reaches its highest recording position, the circuit through magnet 39 is closed at 41, 42, by movement of the lever 33, and the bridging piece 36 is at once attracted toward said magnet until it touches the rails 21 and 22, closing the initial operating circuit as heretofore described for Figs. 1 and 2. When the pen 29 falls again, the bridging piece is left behind (for instance in the position shown in dotted lines). As soon as circuit is opened again at 41, 42, the bridging piece drops upon the pen 29 and is ready for a new operation.

Our invention involves the provision, in connection with the initial circuit controller of a draft-controlling device, of a motive means therefor and means whereby this last may be given a limited action which is automatically repeated as often as the initial circuit controller is operated in a given manner. In Fig. 16, for instance, we have shown a damper 43 in the pipe 44 which may be either the entrance for air or exit flue for the products of combustion. If the $CO_2$ is in excess, showing that the air supply is insufficient, this damper must be turned slightly in the direction of the arrow. This is accomplished by the rotary electric motor 45 when circuit is closed at 21, 22, with the bridging device 24 in the uppermost dotted position (see Fig. 16). When the analysis shows a deficiency of $CO_2$, and less air is wanted, the bridging device 24 is in the lowermost dotted position and the motor 45 is reversed. When the analysis discloses an approximately ideal condition, the bridging piece assumes the middle position in Fig. 16, no circuit will be closed, and the damper remains unmoved.

The preferred means for causing limited movement of the air-controlling device proper is shown in Figs. 12 to 16 inclusive. The motor 45 drives a worm 46 and worm wheel 47. On the shaft of the latter is a sprocket wheel 48 which drives a sprocket chain 49 which in turn revolves a wheel 50 on the shaft supporting the damper 43. A dish-shaped disk 51 is mounted on a shaft of the wheel 47. Two insulated brackets 53, 54, project from the disk 51 toward the wheel 47, and these support conducting terminals 55, 56. On the side toward the disk 51, the shaft of 47 supports a conducting lever 57 which carries a contact terminal 58, and this is so placed that, when the lever is swung one way or the other, the terminal 58 will touch either 55 or 56. Springs 59 and 60 connect the lever 57 mechanically with the brackets 53 and 54 respectively and, when all the parts are in their normal position, these springs determine the position of the lever with relation to the terminals 55 and 56. If it be desired that the motive means 45 should operate by steps of equal length in both directions, the lever is placed normally half way between 55 and 56. By a symmetrical arrangement of the springs, or adjustment of the contacts 55 and 56, movements of different amplitudes in opposite direction may be secured.

As shown in Fig. 15, an expansion friction brake 61 is placed within the dish-shaped disk 51, being composed of two curved portions pivoted to a fixed pin 52 and acting, when pressed apart, to hold the disk 51 by friction against its circular rim. The spring 63 may be used to hold the brake 61 normally out of engagement. The two free ends of the brake sections abut against a pivoted block 64 which is rotated by an arm 65 to set the brake. The magnet or solenoid 66 is provided with an armature 67 connected to said block in such a manner that, when said magnet is energized, the brake is set and the disk 51 with its brackets 53, 54, is held motionless.

A reversing and circuit-maintaining switch governs the motor circuits and is operated electro-magnetically from the initial circuit controller. This device may take various forms of which we have shown two, in Figs. 9 and 16 respectively. In Fig. 16 are shown two separate magnets, 68 and 69, each having its own coil, and having a common armature 70, pivoted as at 71 between them. The long lever is hung on a pivot and moved by the armature 70 one way or the other. On opposite sides of the lever 72 are circuit-maintaining terminals 73, 74, and on the end of the lever are separate insulated contact pieces 75, 76, adapted to close circuit with terminals 77 and 78 or 78 and 79 according to the direction of movement imparted. The springs 80, 81 tend to hold the lever 72 in the middle position shown.

In order to prevent movement of the damper beyond extreme limits a lever 82 projects from the damper shaft and a pin 83 thereon is adapted to open one or the other of the limiting switches 84, 85, in a well known manner.

The mode of operation is as follows:—Assuming the initial circuit to be closed when 24 is anywhere above the "neutral position". Current from any suitable source entering at terminal 86 passes through the resistances 87, 88 to the rail 22; across 24 to the rail 21; by wire 89 to the magnet 69; by the wire 90 to the magnet 66; and thence to terminal 91. Lever 72 is thus swung to the right and the circuit of magnet 69 is preserved by a branch through the wire 92, lever 72 and terminal 74. At the same time, the motor circuit is completed as follows: by the wire 93 and field-magnet coil 94, wire 95, limiting switch 84, contacts 79, 76; wire 96, motor armature, wire 97, contacts 75, 78 and the wire 98 to the main terminal 91. The motor now begins to open the damper (see arrow) and this movement continues until the terminal 58 on the lever 57 touches the terminal 56 on the disk 51. This contact closes a short circuit around the magnets 69 and 66 by wire 99, terminals 56, 58, lever 57 and wire 100. The springs 80, 81, return the lever 72 to the middle position, opening the motor circuit and at the same time, the magnet 66 being short-circuited, releases the brake 61, allowing the disk 51 to be moved by the influence of the springs 59, 60, until the terminals 55, 56 are once more at their normal distances from the terminal 58. If the succeeding analysis still shows an excess of $CO_2$, the damper is similarly moved another step as above described, and this continues until the excess is corrected by a sufficient opening of the damper, or until the limiting switch 84 is operated as stated hereinafter. When an analysis shows a deficiency of $CO_2$, the magnet 68 is energized, instead of the magnet 69, and in an analogous manner the motor 45 causes a step by step movement of the damper in the opposite direction.

As indicated in Fig. 9, we may use a polarized relay having a single magnet 101 with two coils of opposite magnetizing effect, respectively connected to the two sections of the rail 21.

We have thus far described an initial circuit-controller adapted to operation by a $CO_2$ analyzer, but our invention also covers the use in this connection of a circuit-controller dependent upon changes in the heating effect of the furnace. Any well known thermostatic device or steam gage may be used in this way, according to whether the direct heat action is utilized for control or the secondary action of steam pressure is relied upon. We have shown in diagram, in Fig. 16 the dial and pointer of a well known Bourdon spring gage 102, arranged for closing circuit when the steam pressure reaches a maximum or minimum. The movable pointer 103 is connected through a switch 104 to the incoming wire which goes to the rail 22, while the high and low pressure terminals 105, 106, are connected respectively to the lower and upper sections of the rail 21. It will be seen that closure at the low pressure terminal 106 will open the damper and the opening action will continue step by step until circuit is opened either at 106 or at the limiting switch 84. Closure of circuit at the high pressure point 105 will tend to close the damper, in an analogous manner. Since, in most cases, the maintenance of adequate steam pressure is more vitally important than regulation of combustion for economy, the magnet 69 which is in circuit with the low pressure terminal 106 is made stronger than magnet 68, so that, in case of simultaneous closure of both magnet circuits, 69 will prevail. A similar difference will occur in the two coils on the polarized relay 101, when this is used. We have indicated this difference by showing more turns of wire on 69 than on 68.

In the system diagrammatically shown in Fig. 16 there may be two independent but coördinate mechanisms, which are combined to produce the desired result. The first of these, which may be termed the initiatory mechanism, comprises the analyzer or steam gage or both (or their equivalents) with the initial circuit controlling means governed by them. The electro-magnetic reversing switch, the electric motor and the adjuncts whereby the draft controlling means are given a limited motion after each impulse received, may be collectively described as " self-limiting " mechanism for actuating the draft controlling means; and these mechanisms, or their equivalents, are referred to by us by the terms above mentioned in our claims herein.

Our invention may be applied to all kinds of furnace systems and in connection with all kinds of draft controlling devices. In Fig. 17, for instance, we show the wheel 50 connected to the arm 107 of a rheostat controlling an electric motor 108 which runs a blower 109. A main circuit switch is indicated at 110. By weakening the motor field or vice versa the draft is thus made stronger or weaker.

It will be obvious from inspection of the drawing, that the motor circuit is broken and the blower arrested in one extreme position of the arms 107; while at the opposite extreme, maximum speed of the motor is developed.

In Fig. 18 is shown a steam air injector 111 of the Argand type, for instance. The wheel 50 here controls a valve in the steam pipe 112 leading to the injector or blower 111 under the grate 113.

Our system may be applied to a group of boilers in a variety of ways without departing from our invention, and we have shown herein one arrangement wherein a single initial circuit closer (in this case that controlled by the analyzer) is made capable of controlling a separate draft controlling device for each boiler furnace in succession. Devices for accomplishing this are shown in Figs. 8 and 22 to 26, while Figs. 19 and 20 show a specific separate arrangement of these means which is not essential to their employment.

Our invention covers the combination of a single analyzer with gas directing means whereby gas from one furnace to another is successively conveyed to the analyzer; circuit changing means whereby the analyzer circuit controller is brought into operative relation with the corresponding draft controlling devices in succession; and means whereby these devices are operated automatically by analyzer.

One type of combined gas directing device and commutator is shown in Figs. 22 to 26. Here the gas inlet pipe to the analyzer is shown at 114, leading from a bearing 115 which supports one side of a revoluble valve body 116, upon which the commutator segments are preferably supported as hereinafter described. The opposite side of the valve body is supported by the axial projection 117 which turns in the block 118. The various pipes leading from successive furnaces are shown at 119 and pass through the block 118, being arranged in a circle around the projection 117. Within the valve body 116 a gas directing pipe or passage 120 is located, and this extends axially from the abutting end of the pipe 114 for a short distance, then turning outward so as to open at the side of the valve body in a position to register with the openings of the pipes 119, as shown in Figs. 22 and 24. It is clear that, by turning the body 116 a step at a time, so that the pipe 120 registers with one after the other of the pipes 119, gas from one furnace after the other can be conveyed to the pipe 114, and thus to the analyzer. In order to turn the body 116 for this purpose, we prefer the following means. A ratchet wheel 121 is mounted upon the body 116, and on this wheel there rides the end of a pawl 122, the opposite end of which is pivoted to an armature lever 123 drawn normally backward by the spring 124. When the magnet 125 draws the lever 123 forward, the pawl 122, through the wheel 121, revolves the valve body 116 a single step, so as to bring a new pipe 119 into communication with the passage 120.

We have shown two of the many possible means (preferably electric) whereby the single circuit controller of one analyzer may be brought into successive operative relation with the draft controlling device of each furnace from which the analyzer is supplied at corresponding successive periods. These particular devices which take the form of commutators, are not essential to our invention and we prefer to arrange them so that they are closely associated with the above described gas directing device, in this case being operated by the same magnet 125. One of these commutators, shown in Figs. 24 and 26, is applied in connection with the system of circuits shown in Fig. 16, and with a separate motor for each draft-controller, as further shown in Fig. 21. The commutator shown in Figs. 22 and 25 is employed with a single motor and analyzer as hereinafter described in connection with Fig. 19.

In Figs. 24 and 26, the exterior of the insulating valve body 116 is provided with three separate parallel rings, 126, 127, 128, each of which has a projecting tongue, 129, 130, 131. The insulating support 132 bears three brushes, 133, 134, 135, which make constant contact with said three rings. A separate pair of brushes 136, 137, is provided for the armature leads of each motor 45; these pairs of brushes being fixed at equal intervals around the commutator 116 in such a position that, as the same revolves, the tongues 129, 130, are brought into contact with said pairs of brushes successively. Single brushes 138 are similarly placed at proper intervals around the commutator over the tongue 131. In using this commutator with the circuits shown in Fig. 16, the following connections should be made. The break in the wires 96, 97, indicated by dotted lines in Fig. 16 shows where the commutator 116 should be introduced, and in Fig. 21 this is shown according to a different diagrammatic arrangement. Wires 96, 97, connect brushes 133, 134, to the contact terminals 75, 76, on the electro-magnetic switch; while each pair of brushes 136, 137, is connected to the terminals of the armature of one motor 45. (See Figs. 21 and 26). The field magnet wire 93 is shown similarly broken in this figure to indicate where the brushes 135, 138 are connected in circuit. As shown in Fig. 26, the brush 135 is connected to the positive main terminal, while each brush 138 is connected by a wire 93 to one terminal of its appropriate motor field-magnet. The remaining field-magnet terminal is connected to the contacts 79 and 77 of the magnetic switch, preferably through limit stops on the draft-controlling device (See Fig. 16). It will thus be seen that, as the commutator 116 revolves, one motor 45 after another is brought into operative relation with the initial circuit controller of the common analyzer. At the same time the gas-directing means bring to the analyzer gas from the furnace whose draft is controlled by the same motor.

In Fig. 19 is shown a group of six boilers 139, each with its own furnace, arranged in a preferred manner for simultaneous regulation by one analyzer and steam gage. In this arrangement the individual flues 140 from each furnace lead into a main flue 141, while steam is led by branch pipes 142 to the steam main 143. A steam gage 144, connected with the main 143 governs a damper 145 in the main flue, while the damper in each individual flue 140 is separately governed by the draft-controlling device of its own regulator one at a time from a common analyzer, while separate pipes 119 from each flue lead to the gas-directing means as illustrated.

At the right hand side of Fig. 19 we have indicated the connection of parts wherein each damper is controlled by a separate motor 45 as above described. The circles 146 represent the location of the circuits and switches shown in full in Fig. 16. The connection of the commutator 116 with these circuits is omitted in Fig. 19 for greater clearness, although their connection will be made clearer by inspection of the other drawings and particularly in connection with Fig. 21 and the description thereof. In Fig. 16 the motor 45 and parts driven thereby are shown outside the circle 145 as is the analyzer, which is diagrammatically represented by the rails 21, 22. A second arrangement for controlling the drafts at the flues 140 successively is also indicated in Fig. 19 and this will be understood in connection with Figs. 20, 22, 23 and 25. Here a single motor 147 drives a common shaft 148 (by a sprocket chain 149 or otherwise) and this shaft turns the wheels 47 for all the dampers simultaneously, by means of worms 150. It is preferred to introduce flexible couplings 151 between the worms to allow for irregularities of alinement in the shaft 148. The wheels 47 and 50 corresponding to all the flues 140 move together each time the analyzer closes the circuit of the motor 147 (as heretofore described in connection with the motor 45 in Fig. 16) but only one damper is moved at a time, because each wheel 50 permits movement to its own damper through a separate electro-magnetic clutch. These are indicated by circles 152 in Fig. 19 and one typical clutch is shown in partial section in Fig. 20. The magnetizing coils 153 of the various clutches 152 are connected successively in circuit as follows. (See Figs. 22, 23 and 25). The commutator 116 is provided with a single ring 154 having a tongue 155. A single brush 156 bears on the ring 154 and brushes 157 are placed at regular intervals around the commutator in such a position as to touch the tongue 155 one after the other with each step-by-step movement of the commutator. The brush 156 is connected to one terminal in any appropriate generator 158, while each brush 157 is connected, through its appropriate clutch coil 153, to the opposite side of said generator. Thus one damper after the other is mechanically connected to the general driving motor 147. The cables and wires connecting the coils 152 to the analyzer and the gas-directing valve are shown at 200 in Fig. 19.

By use of the arrangement indicated in Fig. 19 (whether used with a separate motor 45 for each damper or with one motor 147 for all) the total draft through all the associated furnaces is controlled in accordance with the total steam output, while each separate furnace is controlled for economy by dampers governed by an analyzer which is operated by admission thereto of gas from each furnace in succession.

Where convenience renders it advisable to place an analyzer at a considerable distance from the furnace or flue whence are drawn gases to be analyzed, the pipes through which these gases are necessarily conveyed will be so long that, under ordinary circumstances, samples of gas drawn therethrough will not represent the present furnace conditions at any given time. In order to obviate this difficulty, we prefer to adopt substantially the following means, shown for example in Figs. 10, 11 and 21. In order to bring through the gas-directing means a sample of gas representing the actual present condition of the furnace at a moment immediately preceding operation of the analyzer, we employ the suction of a steam jet to discharge from the conveying pipe its entire contents, and to cause fresh gas from the furnace or flue to be brought to the analyzer. We provide further automatic means whereby this may be accomplished at exactly the proper time.

In the preferred form shown in the drawings, steam is conveyed through the pipe 159 and valve 160 to the orifice 161 surrounded by the suction cone 162 within the chamber 163. The furnace gas which comes from the gas-directing device by the pipe 164 passes to the passage 165 in the revoluble valve 160. The bend 166 at one end of said passage communicates with the pipe 164 in both positions of the valve. At the opposite end of the passage 165 there is a transverse passage 167 extending through the valve, one end of which opens into the chamber 163 when the valve is in the position shown, at which time the passage 168 leads steam from the pipe 159 to the nozzle 161. In this position the steam passing out at 161 causes discharge of all the gas in the conveying pipe through the opening 169. The valve 160 is adapted to be revolved a one-quarter turn by the lever 170 which is actuated by solenoid 171. When the solenoid 171 is energized the discharge position shown in Fig. 11 is produced. When the solenoid is deënergized however, the spring 172 retracts the lever 170, as in Fig. 19, and access of steam to the nozzle 161 is closed by turning of the passage 168. At the same time the passage 167 is turned 90 degrees so as to register with the opening of the pipe 173 (see dotted line in Fig. 11) this movement brings the passage 165, and consequently the gas-conveying pipe 164, into communication with the pipe 173, which leads directly to the analyzer. Thus it is that, when the solenoid 171 is energized, the conveying pipe is cleared of old gas and new gas fresh from the furnace is brought close to the analyzer. Then when the solenoid is deënergized and the valve returns to its normal position, this new gas is ready to be turned at once into the analyzer by any well known means.

Various devices may be used for closing the circuit of the solenoid 171 at the proper time and we have shown one illustrative modification in Fig. 10 which should be read in connection with Fig. 8 and the description thereof herein given. In this example of possible arrangements, the solenoid 171 is placed in series with the magnets 39 and 125, current being supplied by the generator 40 and circuit being closed when the initial circuit controller is operated, by contact between the pin 31 and the spring 174 on the lever 133. This circuit is maintained while the wheel 32 is acting to throw the lever 33 across its center and this time is sufficient to clear the whole course of the gas-conveying pipes by means of the steam jet at 161. It is obvious that this operation need not of necessity occur at the precise time indicated. It is only necessary that the conveying pipe should be cleared of old gases from time to time (preferably for each operation of the analyzer) and that this clearing should take place at a time when the analyzer is not taking in gas.

It is obvious that the means for closing the circuits of the magnets 39 and 125 shown in Fig. 10 may be employed whether or not the clearing means are used therewith. The specific circuit closers used and the various apparatus interpose between the circuit closer in any case and the agency acting directly to modify the air supply are both immaterial to this present invention in its broadest aspect.

Our invention covers broadly the control by means of residual gas in an analyzer of circuit controlling means arranged so as to cause operations of the air regulator one way or another when that part of the circuit controller moved by the gas is on one side or another of a medium range of position, and so that the air regulator is inactive when said part is anywhere within said medium range.

To better illustrate the arrangement of circuits in connection with the various parts hitherto described, the same is shown diagrammatically in Fig. 21 as applied to the regulation of two boilers. In this figure the combination gas directing device and commutator is shown diagrammatically with concentric circles representing successive narrow cylindrical portions of the commutator side by side and the positions of the entering pipes and of the commutator brushes corresponding to those employed where two boilers are to be controlled successively. The letters of reference are the same as in the other drawings and further description will therefore be unnecessary.

The employment of our invention in one or another of the many variations of which it is susceptible will make it possible to automatically control any desired type of boiler or group of boilers in such a manner as to secure a maximum of economy in combustion consistently with the steam output desired, and this is accomplished with merely occasional attention on the part of an engineer.

It is also to be understood that our invention may be applied to furnaces used for other purposes than for generation of steam, as for instance in hot air heating furnaces.

What we claim is—

1. A device of the class described comprising in combination a gas analyzer, a circuit-controller governed thereby, a reversing switch, electro-magnetic operating means for said switch in circuit with said circuit controller, a draft-controlling device, a reversible electro-magnetic motive means for operating said device and electric circuits between said reversing switch and said motive device, substantially as described.

2. A device of the class described comprising in combination a furnace, a gas analyzer, a circuit-controller governed thereby, an automatic circuit-controller governed by variations in the heat of said furnace, a reversing switch, electro-magnetic operating means therefor in circuit with both of said circuit-controllers, a draft-controlling device, a reversible electro-magnetic motive means for operating said device and electric circuits between said reversing switch and motive means, substantially as described.

3. A device of the class described comprising in combination a draft-controlling device, an electric motor mechanically connected thereto, a reversing switch in the circuit of said motor, an electro-magnetic means for operating said switch, a gas analyzer and a circuit-controller governed thereby for closing circuits through the coils of said electro-magnetic means, substantially as described.

4. A device of the class described comprising in combination a draft-controlling device, an electric motor mechanically connected thereto, two circuit-breakers in circuit with said motor, means actuated by said draft-controlling device at its opposite limits of movement for operating said circuit breakers, a reversing switch in the circuits of said motor, an electro-magnetic means for operating said switch, a gas analyzer and a circuit-controller governed thereby for closing circuits through the coils of said electro-magnetic means, substantially as described.

5. A device of the class described comprising in combination a furnace, a draft controlling device therefor, an electric motor mechanically connected thereto, a reversing switch in the circuits of said motor, electro-magnetic means for operating said switch, a gas analyzer, a circuit-controller governed thereby, a second circuit maker automatically governed by changes in the heat of said furnace and circuits connecting both of said circuit makers with the coils of said electro-magnetic means, substantially as described.

6. A device of the class described comprising in combination a furnace, a draft-controlling device therefor, an electric motor mechanically connected thereto, a reversing switch in the circuits of said motor, an electro-magnetic means operating said switch and having a strong and a relatively weak set of energizing coils, a gas analyzer, a circuit-controller governed thereby in circuit with said weak coils and a second circuit maker automatically governed by changes in the heat of said furnace in circuit with said stronger coils, substantially as described.

7. In a device of the class described, a draft-controlling device, an electric motor therefor, a pair of reversing magnets, a switch governing said electric motor and operated in opposite directions by said magnets respectively, circuit-preserving contacts for the coils of each of said magnets adapted to be brought together by appropriate movements of said switch, a gas analyzer and circuits controlled by movements thereof and including the coils of said magnets and said contacts, substantially as described.

8. A device of the class described comprising in combination a draft controlling device, an electric motor therefor, two parallel rails one of which is interrupted and the other of which is continuous, a switch for said motor, an electro-magnetic operating means for said switch having two separate coils, a source of electric current, an electric connection from the continuous rail to one terminal of said source and an electric connection from each section of the interrupted rail to the other terminal through said two electro-magnetic coils respectively in combination with a gas analyzer and a bridging device operated thereby so as to close circuit across said rails at different points as said bridging device is moved, substantially as described.

9. A device of the class described comprising in combination a draft-controlling device, an electric motive means therefor, a circuit-controlling device therefor, an automatic device operated by movement of the motive means for stopping the same and a restoring means for preparing said automatic device for repetition of operation, substantially as described.

10. A device of the class described comprising in combination a draft-controlling device, an electric motive means therefor, an initial circuit-controlling device, a circuit-maintaining device, an automatic device operated by movement of the motive means for making inoperative said circuit-maintaining device and a restoring means for preparing said automatic device for repetition of operation, substantially as described.

11. A device of the class described comprising in combination a draft-controlling device, an electric motive means therefor, a starting switch for said motive means, an operating magnet therefor, an automatic device for short-circuiting said operating magnet and a restoring means for automatically preparing said short-circuiting device for repetition of operation, substantially as described.

12. A device of the class described comprising in combination a draft-controlling device, an electric motive means therefor, a starting switch for said motive means, an operating magnet for said switch, a revoluble disk carrying contacts in circuit with said operating magnet, a flexible connection between the motive means and said disk, and automatic means for successively holding and releasing said disk, substantially as described.

13. A device of the class described comprising in combination a draft-controlling device, an electric motive means therefor, a revoluble disk flexibly connected to said motive means, a short-circuiting device one member of which is directly moved by the motive means and the other member of which is carried by said disk, and automatic means for successively holding and releasing said disk, substantially as described.

14. A device of the class described comprising in combination a draft-controlling device, an electric motive means therefor, an initial circuit controller, a revoluble disk, a flexible connection between said motive means and said disk, an electro-magnetic device for holding said disk stationary, and electrical contact devices moving respectively with said motive means and said disk arranged to short-circuit said electro-magnetic holding device and said initial circuit controller, substantially as described.

15. A device of the class described comprising in combination a draft-controlling device, an electric motive means therefor, a reversing switch for said motive means, an electro-magnetic means for operating said switch, an initial circuit-controller for said electro-magnetic means, an electric contact piece moving with said motive means, a second movable contact piece in the path of the first, an electro-magnetic device for holding said second contact piece stationary and a short-circuit closed through said two contact pieces around said switch-operating means, and said electro-magnetic holding device, substantially as described.

16. A device of the class described comprising in combination a draft-controlling device, an electric motive means therefor, a reversing switch for said motive means, an electro-magnetic means for operating said switch, an initial circuit-controller for said electro-magnetic switch operator, a revoluble disk, a flexible connection between the same and said motive device, an electro-magnetic holding means for said disk and electrical contact pieces moving with said motive means and disk for short-circuiting said switch-operating means, said motive means and said electro-magnetic holding means, substantially as described.

17. A device of the class described comprising in combination a draft-controlling device, a revoluble motive means therefor, a lever fixed to and revolving with said motive means, a revoluble disk bearing two electrical contacts, an electro-magnetic brake, a contact piece on the lever for completing a short circuit around said brake and two insulated springs mechanically connecting said lever with said disk, substantially as described.

18. A device of the class described comprising in combination a draft-controlling device, an electric motive means therefor, an electro-magnetic means for establishing and maintaining circuit through said motive means, a gas analyzer, a circuit-controlling means operated thereby and in circuit with said circuit-maintaining means, a steam gage and a second circuit-controlling device operated by said gage and also in circuit with said circuit-maintaining means, substantially as described.

19. A device of the class described comprising in combination a plurality of furnaces, a draft-controlling device for each, an automatic gas analyzer, a plurality of gas-conveying pipes communicating with said furnaces individually, a directing valve with which said pipes communicate for placing them successively in operative relation with said analyzer, and means for moving said valve controlled by the movements of said analyzer, substantially as described.

20. A device of the class described comprising in combination a plurality of furnaces, a draft-controlling device for each, an automatic gas analyzer, a plurality of gas-conveying pipes communicating with said furnaces individually, a directing valve with which said pipes communicate for placing them successively in operative relation with said analyzer, electro-magnetic means for moving said valve, and a circuit controlled by movement of said analyzer for energizing said valve moving means, substantially as described.

21. A device of the class described comprising in combination a plurality of furnaces, a draft-controlling device for each, a gas-directing means having entrance pipes arranged around a common center and communicating with said furnaces individually, a revoluble directing pipe placed so as to register at one end with said entrance passages successively, an automatic analyzer to which said directing pipe leads, and electromagnetic means for turning said directing pipe step by step, substantially as described.

22. In a device of the class described, and in combination with a plurality of furnaces and a draft-controlling device for each; an automatic gas analyzer provided with a gas inlet and a circuit closer, in combination with a plurality of gas entrance pipes arranged around a common center and communicating with said furnaces individually, a revoluble directing pipe placed so as to register at one end with said entrance pipes successively and connected at its other end to said inlet pipe of the analyzer, electromagnetic revolving means for said directing pipe and an energizing circuit connecting said revolving means with the circuit closer of the analyzer, substantially as described.

23. In combination with a plurality of furnaces, a separate draft-controlling device for each, a separate electrically operated actuating means for each draft-controlling device, a gas analyzer, circuit-modifying means governed by said analyzer, and a multiple switch controlled by movement of said analyzer for connecting said circuit modifying means with the actuating means of each draft controller successively, substantially as described.

24. In combination with a plurality of furnaces, a separate draft-controlling means for each, a separate electrically operated actuating means for each draft controlling means, a gas analyzer, a gas-directing valve communicating with said analyzer, a separate gas conveying pipe leading from each furnace to said valve, actuating means for said valve controlled by said analyzer, and a multiple switch controlled by said analyzer for placing it in operative relation with the different draft controller actuators in succession, substantially as described.

25. In combination with a plurality of furnaces and separate electrically actuated draft-controlling means for each, a gas analyzer, a combined gas-directing device and commutator, means for operating the same controlled by said analyzer, gas-conveying pipes from said furnaces to the gas-directing device and circuits from said commutator to said draft-controlling means, substantially as described.

26. A battery of boilers with separate furnaces, a main flue and branch flues, a steam main and branch steam pipes; in combination with a gas analyzer, means for conveying gases from each branch flue in turn thereto, a separate draft-controlling device at each furnace, separate actuating mechanism for each draft-controlling device, governing means for said actuating mechanism controlled by said analyzer, means for bringing said analyzer into operative relation with each actuating mechanism successively, a draft-controlling device for the main flue, actuating mechanism therefor and an automatic regulator for said last named actuating mechanism connected to said steam main and controlled by changes in steam pressure, substantially as described.

27. A device of the class described comprising in combination a number of furnaces, a draft-controlling device for each, a separate reversible electric motor for actuating each draft-controller, a single gas analyzer, a reversing switch governed thereby and a commutator controlled by said analyzer for connecting said reversing switch electrically with each motor in turn, substantially as described.

28. A device of the class described comprising in combination a number of furnaces, a draft-controlling device for each, a single reversible electric motor, electro-magnetic devices for mechanically connecting the draft-controlling devices to said motor one at a time, a single gas analyzer and a commutator controlled by said analyzer for bringing said electro-magnetic devices successively into operation, substantially as described.

29. A device of the class described comprising in combination a number of furnaces, a draft-controlling device for each, a rotary electro-magnetic clutch for each draft-controlling device, a common rotary worm shaft for simultaneously rotating one member of all of said clutches, an electric motor for driving said shaft, a gas analyzer for controlling said motor and a commutator controlled by said analyzer for energizing said clutches successively, substantially as described.

30. In a device of the class described, and in combination, a plurality of draft-controlling devices, electro-magnetic mechanisms for determining the operation of each of said devices separately, a rotary commutator bearing a conducting ring having a projecting tongue, a brush bearing on said rings and a number of brushes arranged at equal intervals around said commutator so as to bear on said tongue, conductors connecting said brushes to said electro-magnetic mechanisms, a gas-analyzer, and electro-magnetic means controlled thereby for rotating said commutator, substantially as described.

31. In a device of the class described, and in combination, a plurality of draft-controlling devices, electric motors for operating each of said devices separately, a rotary commutator bearing a plurality of parallel conducting rings, each having a projecting tongue, a brush bearing on each of said rings, a separate set of symmetrically placed brushes arranged to bear on each of said tongues, conductors connecting said brushes to the operating circuits of said motors, a gas analyzer and electro-magnetic means controlled thereby for rotating said commutator, substantially as described.

32. In a device of the class described and in combination, a plurality of furnaces, a draft-controlling device for each, electro-magnetic mechanisms for determining the operation of said devices separately, a number of circularly arranged gas-conveying pipes communicating with said furnaces individually, a rotary commutator in circuit with said electro-magnetic mechanisms and carrying a single gas-directing pipe arranged to register with each gas-conveying pipe in succession, a gas analyzer communicating with said gas-directing pipe, and electro-magnetic means for rotating said commutator, substantially as described.

33. In a device of the class described, and in combination, a plurality of furnaces, a draft-controlling device for each, a gas analyzer comprising an automatic gas valve, a gas-directing device, separate gas conveying pipes leading thereto from each furnace separately, electro-magnetic means for operating said gas-directing device, and a circuit closer for said electro-magnetic means operated by movement of said first named gas valve, substantially as described.

34. In a device of the class described, and in combination, a gas analyzer comprising an automatic gas valve, a plurality of draft-controllers, separate electrically controlled means for actuating each controller, a commutator for bringing said separate means successively into operation, and an electro-magnetic device for actuating said commutator operated by movement of said gas valve, substantially as described.

35. A device of the class described comprising in combination an initial circuit controller, a gas analyzer for operating the same, a draft controlling device, a single motive means therefor, and means for automatically limiting the extent of operation of said single motive means while preserving its operative relation to said circuit controller in all positions of said circuit controller, substantially as described.

36. A device of the class described comprising in combination an analyzer, a gas conveying pipe, clearing means in said pipe, an actuating device therefor, a draft controlling device, actuating means for the draft controlling device, and automatic means controlled by said analyzer for causing operation of said actuating device for the clearing means and of said actuating means for the draft controlling device, substantially as described.

37. A device of the class described, comprising in combination an analyzer, a gas conveying pipe therefor, a gas-directing device inserted in the course of said pipe, clearing means for said pipe, a draft controlling device, actuating means for the draft controlling device, and automatic means controlled by said analyzer for causing operation of said gas directing device, of said pipe clearing means and of said actuating means for the draft controller, substantially as described.

38. A device of the class described comprising in combination an analyzer, a gas conveying pipe therefor, clearing means for said pipe, an actuating device therefor, a draft-controlling device, an initial circuit controller for said draft-controlling device, and automatic means controlled by said analyzer for causing substantially simultaneous operation of said actuating device and of said circuit controller, substantially as described.

39. A device of the class described comprising in combination an analyzer, a gas conveying pipe therefor, a clearing means for said pipe, a draft controlling device, an electro-magnetic actuator for the clearing means, a second electro-magnetic actuator for the draft controlling device, and a circuit closer operated by said analyzer for operating both of said electro-magnetic actuators, substantially as described.

40. A device of the class described comprising in combination an analyzer, a gas conveying pipe therefor, a clearing means for said pipe, an electro-magnetic actuator for said means, a draft controlling device, an electro-magnetic actuator therefor, an exit valve for the analyzer, an electric circuit for said actuators, and means for simultaneously operating said exit valve and closing said circuit, substantially as described.

41. A device of the class described comprising in combination an analyzer, a gas conveying pipe therefor, a clearing means for said pipe, an electro-magnetic actuator for said means, a draft-controlling device, an electro-magnetic actuator therefor, an exit valve for the analyzer, an operating lever therefor, a spring on said lever in circuit with said electro-magnetic actuators, and a conducting pin for automatically pushing said spring to operate said lever, said pin being also in circuit with said actuating device, substantially as described.

42. A device of the class described comprising an analyzer, a gas conveying pipe therefor, a draft controlling device, and intermediate self-limiting apparatus for governing the action of said device; in combination with a circuit controller comprising a movable member and two stationary members arranged for alternate contact with said movable member, electric connections between one of said stationary members for causing movement of said intermediate governing apparatus in one direction when circuit is made with said movable member, and separate electric connections between the other of said stationary members for causing movement of said intermediate apparatus in the opposite direction, substantially as described.

43. In a device of the class described, and in combination, a draft controlling device, self-limiting mechanism for actuating the same, and initiatory mechanism from which said actuating mechanism is adapted to receive periodic impulses, said initiatory mechanism including a gas analyzer and a circuit controller operated thereby, substantially as described.

CYPRIEN O. MAILLOUX.
HENRY J. WESTOVER.

Witnesses:
N. STEVEN,
H. S. MACKAYE.